US007112251B2

(12) United States Patent
Majumdar et al.

(10) Patent No.: US 7,112,251 B2
(45) Date of Patent: *Sep. 26, 2006

(54) GLOW-IN-THE-DARK TIRE SIDEWALLS

(75) Inventors: Ramendra Nath Majumdar, Hudson, OH (US); Jennifer Leigh Gabor, Lawton, OK (US); Susan Lynn Deevers, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/973,499

(22) Filed: Oct. 25, 2004

(65) Prior Publication Data

US 2005/0109440 A1    May 26, 2005

Related U.S. Application Data

(62) Division of application No. 09/532,371, filed on Mar. 21, 2000, now Pat. No. 6,807,995.

(51) Int. Cl.
*B29D 30/72* (2006.01)
*B60C 13/00* (2006.01)
*B60C 13/04* (2006.01)

(52) U.S. Cl. .................... 156/116; 156/67; 156/110.1; 152/524; 152/525

(58) Field of Classification Search .............. None
See application file for complete search history.

(56) References Cited

U.S. PATENT DOCUMENTS

| 3,253,634 | A | * | 5/1966 | De Young ................ 152/523 |
| 3,607,498 | A | * | 9/1971 | Kubota .................... 156/116 |
| 3,844,810 | A | * | 10/1974 | Pollard .................... 106/452 |
| 4,865,937 | A | * | 9/1989 | Santilli et al. ........ 430/137.18 |
| 6,431,236 | B1 | * | 8/2002 | Kanenari et al. ........... 152/450 |

FOREIGN PATENT DOCUMENTS

| EP | 0249918 | * | 12/1987 |
| EP | 744304 | * | 11/1996 |
| JP | 53007778 | * | 1/1978 |
| JP | 10-907 | * | 1/1998 |

OTHER PUBLICATIONS

Translation of Shimizu (JP 10-907).*

* cited by examiner

*Primary Examiner*—Justin R. Fischer
(74) *Attorney, Agent, or Firm*—Henry C. Young, Jr.; Daniel J. Hudak, Jr.

(57) ABSTRACT

The present invention relates to a tire having a portion thereof such as a sidewall component that glows-in-the-dark due to the presence of a phosphorescent layer thereon. The present invention also relates to a tire having, and to a process for incorporating, a phosphorescent decal on the sidewall component. Very small amounts of phosphorescent material are used, resulting in a low cost safety tire.

41 Claims, 3 Drawing Sheets

GLOW-IN-THE-DARK TIRE SIDEWALLS

CROSS REFERENCE

This is a division of application Ser. No. 09/532,371, filed on Mar. 21, 2000, now U.S. Pat. No. 6,807.995, granted Oct. 26, 2004, of Majumdar et al., for "GLOW-IN-THE-DARK TIRE SIDEWALLS".

FIELD OF THE INVENTION

The present invention relates to a tire having a portion thereof such as a sidewall component that glows-in-the-dark due to the presence of a phosphorescent layer thereon. The present invention also relates to a tire having, and to a process for incorporating, a phosphorescent decal on the sidewall component.

BACKGROUND OF THE INVENTION

Heretofore, tires for vehicles have had fluorescent or phosphorescent particles mixed or implanted within the rubber mixture of a fire in order to give bright reflective, or afterglow characteristics. Examples of such tires can be found in Great Britain Patent No. 2,265,586 to Hare and Japanese Patent Application No. HEI3-160039 by Fukomoto. Generally, a fluorescent substance has no afterglow because the light emitted from the fluorescent substance decays immediately after removal from the source of excitation.

A problem with the prior art incorporation of phosphorescent or fluorescent material into the rubber composition of a tire, is that the resulting product still shows minimal afterglow even though a high amount of phosphorescent/fluorescent pigment is used.

SUMMARY OF THE INVENTION

An object of the present invention is to provide a process for forming a tire having a glow-in-the-dark sidewall component, comprising the steps of compounding and mixing a non-black sidewall compound, applying a phosphorescent layer to at least a portion of the surface of the non-black sidewall component to form glow-in-the-dark phosphorescent sidewall component, applying said phosphorescent sidewall component on an uncured pneumatic tire, and curing (molding and crosslinking) said tire so that said tire has a phosphorescent sidewall portion.

Another object of the present invention is to provide a vulcanized pneumatic tire with a sidewall which has glow-in-the-dark properties due to the presence of phosphorescent pigment incorporated thereon.

A still further object of the present invention relates to a tire having a recessed area, or areas, in the sidewall portion thereof such as a ring or ring like structure around the sidewall portion of the tire. The recessed area contains a phosphorescent layer applied thereto by one of the methods of the present invention. The phosphorescent layer in the recessed area is protected from road or surface hazards such as curbs and other objects.

Another object of the present invention is to apply a cured glow-in-the-dark decal with an adhesive to a tire sidewall, which is then incorporated into a green tire and subsequently cured. A tire is thereby formed having glow-in-the-dark decals on the sidewall portion thereof.

A further object of the invention is to apply an uncured glow-in-the-dark decal to a sidewall which is incorporated into a green tire. The entire assembly is subsequently cured.

These and other features and advantages of the present invention will become apparent to persons skilled in the art from the following detailed description.

DETAILED DESCRIPTION

According to an embodiment of the present invention, a vulcanized rubber article, specifically a tire, is disclosed with a sidewall which contains a phosphorescent layer thereon, or at least partially embedded therein, or adhered, thereto. As utilized throughout the specification, the phosphorescent layer can be pigment per se, or pigment mixed with a carrier as defined herein below. The present invention teaches a phosphorescent layer incorporated onto or into the outer surface of a tire sidewall portion which is preferably white or non-black, the sidewall 60 being a component in a toroidal shaped pneumatic tire 10. It is preferable to apply the phosphorescent layer to the surface of the non-black sidewall component so that the glow-in-the-dark or afterglow properties are maximized. No phosphorescent layer is added to the black portion of the tire or tire sidewall because very minimal or no afterglow is observed. By the term "non-black" it is meant any color or reflectivity which is greater than 40, on the CIE 1976 L* scale. The white or non-black rubber of the present invention generally has a CIE 1976 L* value of at least 40, desirably at least 50, preferably at least 60, and more preferably at least 70, 80, or 85. A pure white color on the CIE 1976 L* scale has a value of 100, while a pure black color has a value of 0. Reference to the CIE 1976 L* scale can be readily found in ASTM E-308-94a. The invention can also be utilized with other rubber products such as bumper strips, vehicle protection or trim strips, tennis shoes or the like.

Figure 1:
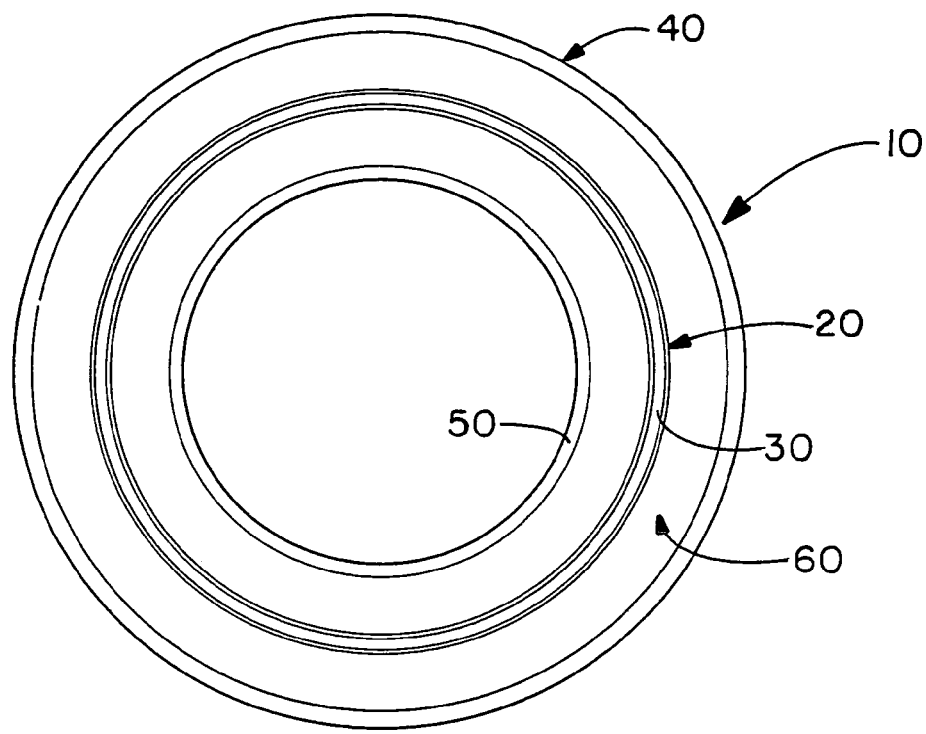
FIG. 1 is a pneumatic tire having a recessed ring in the sidewall portion thereof, wherein the recessed ring contains a phosphorescent layer thereon.
Figure 2:
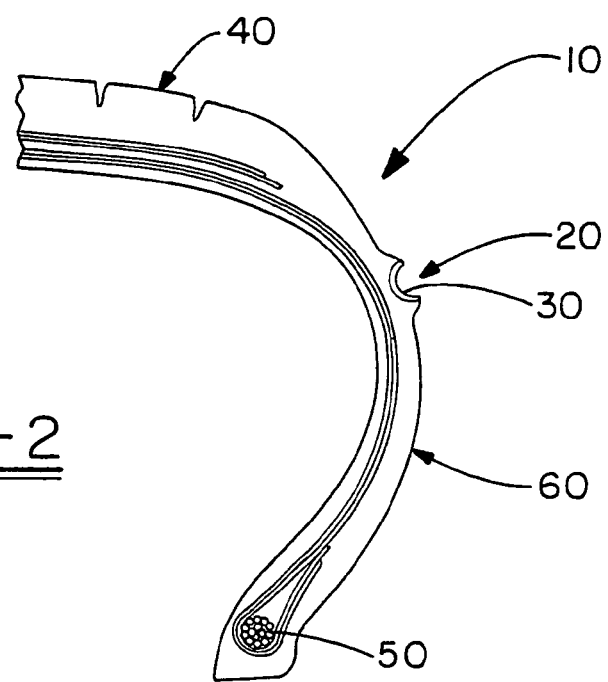
FIG. 2 is a cross-sectional view of the tire in FIG. 1, before being buffed, showing a phosphorescent layer located in the recessed portion of the tire sidewall.
Figure 2A:
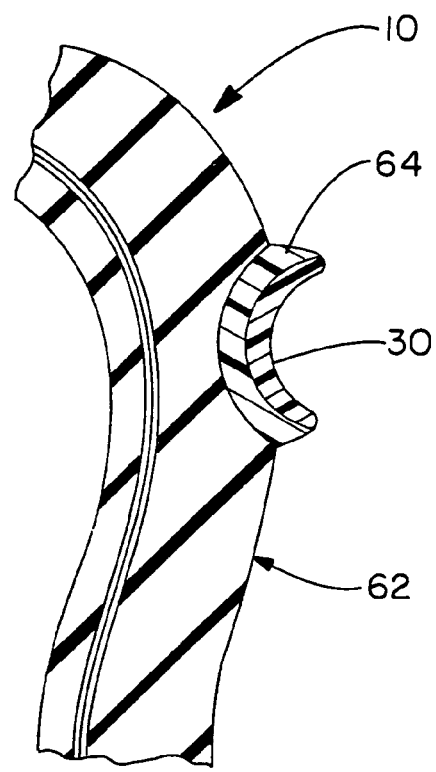
FIG. 2(a) is a partial cross-sectional side elevation view of the tire in FIG. 2 showing the substrate rubber, a layer of non-black rubber thereon, and a phosphorescent layer coated thereto. The tire has not yet been buffed.
Figure 2B:
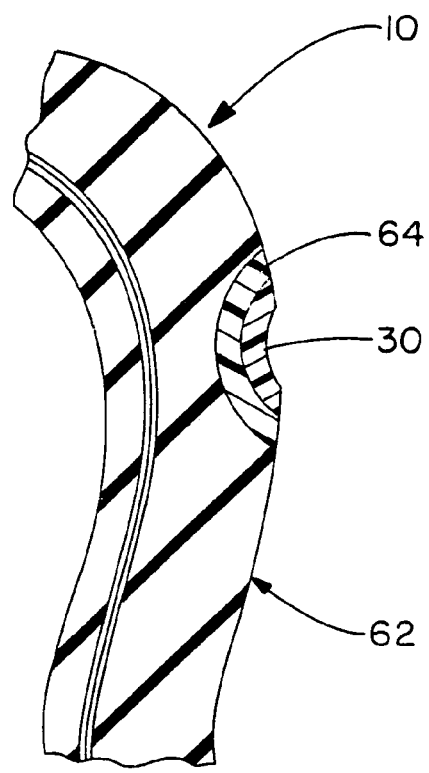
FIG. 2(b) is a partial cross-sectional side elevation view of the tire in FIG. 2(a) after being buffed. The substrate rubber, non-black rubber, and phosphorescent layer can be seen in this figure.

Generally, pneumatic tires, as can be seen in FIGS. 1, 2(a), and 2(b), comprise a tread region 40, which contacts the road or other substrate, two or more sidewalls 60 which provide lateral support, and a bead area 50 which makes contact with a rim.

The tire sidewall of the present invention can comprise a number of components such as a black rubber component 62, and white or non-black rubber component 64.

The black rubber component sidewall, or substrate rubber, or any other rubber component of a tire is generally made out of conventional rubbers or blends thereof. For example, the black rubber component can be made from one or more conjugated dienes having from 4 to 10 carbon atoms such as butadiene, isoprene such as synthetic or natural rubber, and the like. Alternatively, the rubber can also be made from one or more conjugated dienes having from 4 to 10 carbon atoms with a vinyl substituted aromatic having from 8 to 12 carbon atoms such as styrene, alpha-methylstyrene, and the like such as styrene-butadiene rubber. Preferred black rubbers generally include polybutadiene, natural rubber, synthetic polyisoprene, styrene-butadiene rubber, and combinations thereof.

The black sidewall component generally makes up the inner portion of the sidewall, and contains plies and the non-black sidewall component is overlaid thereon. The black component of the sidewall is generally thicker and wider relative to the non-black component. Since the black component is generally wider than the non-black component, a portion of the black component is also located on the outer surface of the sidewall component. The non-black component generally forms about 1 to about 100 percent, desirably from about 5 to about 50 percent, and preferably from about 6 to about 20 percent of the exposed surface area of the sidewall portion of the tire.

A preferred method of forming the sidewall is to extrude both the black, and white or non-black sidewall component. The black and non-black components can be separately extruded and then tacked with one applied to the other or they can be simultaneously co-extruded, one component layer over another. The exposed surface of the non-black outer layer is then coated in the desired area with the phosphorescent layer prior to curing.

The sidewall component comprising the black and non-black components is then molded and cured with the rest of the tire components. The tire mold is desirably designed so that portions of the white or non-black component are recessed (see 30 in FIGS. 2(*a*) and 2(*b*)). Often, it is desirable to buff the sidewall portion of the tire after it has been cured in order to perfectly center, expose, or accentuate features thereon. Buffing can entail partially grinding or abrading away portions of the sidewall including the thin layer of the non-black sidewall in selected areas to partially remove the same and expose any desired features on the sidewall rubber, but at least leaving the white or non-black compound in the sidewall recesses. Desirably, the phosphorescent layer that is to remain on the tire is not buffed. Buffing is conventional and known to one of ordinary skill in the art. Both the black, and white or non-black sidewall components can have indicias, features and/or formations thereon, which include words, a trade name, tire sizes, shape designations, logos, etc., which can be raised, e.g. protrudes above the sidewall, or recessed in the sidewall, etc. A non-black recessed annular ring is a preferred embodiment (see FIG. 1).

The black component of a tire sidewall, and other carbon black containing components of a tire often contain antioxidants and other oil soluble components which tend to discolor or stain many white rubber compounds. The staining antioxidants and other oil soluble components give desirable properties to the tire, which cannot be economically achieved with non-staining components.

The white or non-black sidewall component of the present invention contains a blend of elastomers or rubbers. One such rubber is a conjugated diene rubber, that is a homo or copolymer of one or more conjugated dienes having from 4 to 10 carbon atoms and desirably from 4 to 8 carbon atoms such as butadiene, isoprene, hexadiene, and the like with preferred rubbers being natural rubbers, synthetic polyisoprene, polybutadiene, and so forth. Alternatively, the copolymer can be made from one or more of the conjugated dienes having from 4 to 10 carbon atoms with a vinyl substituted aromatic having from 8 to 12 carbon atoms such as styrene, alpha-methylstyrene, and the like such as styrene-butadiene rubber.

Other types of rubbers which can be utilized in the non-black component are the various monoolefin or halogenated monoolefin rubbers containing from 4 to about 8 carbon atoms such as butylene, pentylene, and the like. When halogenated as with chlorine or bromine, the amount thereof is generally from about 0.25 to about 3 weight percent and desirably from about 0.5 to about 2.0 weight percent of the halogen based upon the total weight of the rubber. In order that the amount of olefin rubber can be cured or cross-linked, a small amount thereof such as from about 0.1 to about 7 weight percent, and desirably from about 1 to about 3, 4 or 5 weight percent is derived from a conjugated diene having from 4 to about 6 carbon atoms such as butadiene, isoprene, and the like. The preferred monoolefin rubber is butyl rubber, halogenated butyl rubber, e.g. bromobutyl rubber or chlorobutyl rubber.

The amount of the rubber derived from one or more conjugated diene monomers, or one or more such monomers with one or more substituted vinyl aromatic monomers, is generally 0 or from about 0.1 to about 50 parts by weight, desirably from about 10 to about 45 parts by weight and preferably from about 20 to about 40 parts by weight based upon the total parts by weight of said conjugated diene rubber and said monoolefin rubber. Accordingly, the amount by weight of said monoolefin rubber is from about 50 to about 99.9 or 100 parts by weight, desirably from about 55 to about 90 parts by weight and preferably from about 20 to about 80 parts by weight.

An optional but generally utilized component of the rubber blend is rubber derived from ethylene monomers, propylene monomers, as well as a non-conjugated diene monomer such as norbornene, ethylidene norbornene, dicyclopentadiene, 1,4-hexadiene, and the like. Such rubbers are generally referred to as ethylene-propylene-diene rubbers, i.e. EPDM. These rubbers generally contain from about 20 to about 90 weight percent, and desirably from about 30 to about 85 weight percent ethylene, from about 10 to about 80 weight percent, and desirably form about 15 to about 70 weight percent of at least one alpha-olefin having from 3 to 16 carbon atoms (usually mostly propylene) based on the total repeating units of ethylene and the alpha-olefins, and from about 0.1 or 0.3 to about 0.8 or 1.0 moles of one or more nonconjugated dienes having from 6 to 12 carbon atoms per kilogram of the ethylene and alpha-olefin repeat groups in the copolymer. The amount of said EPDM rubber is generally from about 0.0 or 0.5 or 1 to about 10, and desirably from about 3 to about 8 parts by weight for every 100 parts by weight of the conjugated diene-monoolefin rubber.

Optionally, the rubber blend of the present invention can contain small or significant amounts of copolymers having at least 50 weight percent derived from about a monoolefin having from 4 to 7 carbon atoms with a para-alkylstyrene wherein the alkyl group has from 1 to 5 carbon atoms. Desirably, such isomonoolefin-para-alkylstyrene copolymers contain from about 80 to about 99 percent, and preferably from about 85 to about 98 percent by weight of isomonoolefin repeat units therein and accordingly from about 1 to about 20 percent and preferably from about 2 to about 15 percent of repeat units derived from the para-alkylstyrene. Such rubbers are commercially available from Exxon as Chlorobutyl 1066, Chlorobutyl 1068, and Exxpro Elastomer. Such copolymers can also be halogenated, as for example chlorinated or brominated in an amount of up to about 5 percent by weight, desirably from about 0.1 or 0.2 to about 1.5 or about 2.5 percent by weight of bromine or chlorine.

The amount of the isomonoolefin-para-alkylstyrene copolymer can be zero, i.e. non-existent, or it can form the entire non-black or white rubber component. That is, the blend of the conjugated diene rubber and the monoolefin rubber is non-existent. However, such an embodiment is not preferred inasmuch as the copolymer of the isomonoolefin and the para-alkylstyrene is relatively expensive. Typically, when utilized, the amount of the copolymer rubber derived from an isomonoolefin and a para-alkylstyrene is from about 0.1 to about 100, and desirably from about 45 to about 75 parts by weight for every 100 parts by weight of the rubber blend of the conjugated diene rubber and the monoolefin rubber.

Additives and fillers can also be added to the non-black sidewall component composition. Fillers generally are particulate material added to either reduce the total cost or to enhance the stiffness and/or modify the chemical resistance of a composition. Reinforcing fillers tend to enhance the strength of a composition. While carbon black can be utilized, it is not desirable in the white or non-black sidewall component and hence is used in low amounts generally less than 2 parts per 100 parts of rubber (PHR), more desirably less than 1.5 or 1 PHR, and preferably less than 0.5 or 0.25 PHR such that the composition would not be black. Preferably, the non-black sidewall component of the present invention is substantially free if not completely free, that is having zero parts, of carbon black per 100 parts of rubber.

Suitable and desired fillers include talc, clay, silica, etc. These may function in addition as pigments or pigment extenders but their principal function are as fillers. Significant amounts of fillers are generally utilized in the non-black or white rubber such as clay. The amount of such fillers, for example clay, is generally from about 20 or 30 to about 70 or 80 and desirably from about 40 or 50 to about 60 or 65 parts by weight for every 100 parts by weight of the conjugated diene-monoolefin rubber.

Pigments other than the phosphorescent pigments used in the present invention are desirably added to the composition. Thus, any white or non-black pigments can be used in the sidewall rubber formulations. Desirably, the pigments used have good color retention during aging and resistance to discoloring or degrading upon U.V. exposure or they are formulated with age resistors or U.V. protectors to provide color integrity in the final product. The pigments desirably are insoluble in the elastomer component and are consequently dispersed in particulate form. Desirable pigments include titanium dioxide, zinc oxide, white lead and antimony oxide, as well as precipitated silica, calcium silicate, calcium carbonate, talc, and whiting. Desirably the pigments are used in an effective amount to make sidewall composition opaque rather than translucent or clear. The preferred pigment is titanium dioxide (TiO2) which is used here to define any coated or uncoated TiO2 pigment used as a white pigment. Desirable amounts of TiO2 utilized generally are at least 20 parts by weight, desirably at least 30 parts by weight and preferably at least 40 parts by weight to about 70 parts by weight based on 100 parts by weight of the conjugated diene-monoolefin rubber.

Other additives added to the rubber composition can include processing aids and/or oils which generally enhance a composition's speed and ease of processing. They may function by reducing an elastomer's molecular weight or by lubricating the elastomer's surface. Such other additives include various fatty acids such as stearic acid, zinc oxide, antidegradants, antiozonants, U.V. protectors and the like. Waxes are desirably used because they tend to bloom to the surface and protect the elastomer immediately below the waxy surface. The additives may absorb or neutralize harmful materials or energy or they can function to block a mechanism of aging or degradation. Processing oils include non-staining oils such as naphthenic, paraffinic, and the like.

Known crosslinking agents (also known as curatives) which can be used include sulfur, sulfur accelerators, peroxides, other non-sulfur curatives, sulfur donor compounds, etc. Sulfur accelerators include guanidines, thiurams, dithiocarbamates, thioureas, thiazoles, sulfonamides and xanthates. Peroxides include dialkyl peroxides, peresters, hydroperoxides, peroxydicarbonates, etc. Crosslinking agents also include zinc oxide, etc. The use of these crosslinking agents, their effective amounts etc., are well known to the art. Vulcanization is a subset of the crosslinking process. Crosslinking agents are also known as curatives. Crosslinking is often called curing in the art of rubber processing.

The non-black sidewall component is compounded and mixed in a manner as commonly known in the art. Then, as stated above, the non-black sidewall component is extruded and formed, along with other sidewall components into a sidewall of desired shape and size according to the specifications of the tire to be formed.

The phosphorescent layer of the present invention can exhibit many forms. For example, it can be a layer of phosphorescent pigment per se. Alternatively, it can be a layer comprising or containing a phosphorescent pigment and a carrier. Another form of the layer is a blend of a pigment. Other forms of the phosphorescent layer can also exist. The phosphorescent layer can be attached to the non-black or white layer in any manner such as through neat incorporation by simply residing the layer thereon and curing the non-black or white rubber substrate thereby fixing, attaching, or partially embedding the phosphorescent pigment layer therein, and the like.

One desirable process for a phosphorescent layer incorporation onto the surface of the non-black sidewall component is as follows. After the sidewall component is extruded, the outer non-black rubber layer of the extruded sidewall component is placed in contact with phosphorescent layer which contains only phosphorescent pigment. The phosphorescent layer (pigment) sticks well to the tacky surface of the extruded non-black sidewall compound. The phosphorescent containing sidewall component is assembled into an uncured pneumatic tire assembly and then molded and cured as known to the art. Phosphorescent material incorporated by this technique utilizes very low quantities of phosphorescent pigment, and the rubber shows high glow-in-the dark properties when compared to one prepared by shear mixing into the black or non-black rubber compounds and then buffing. When the non-black sidewall component is cured, the phosphorescent layer is adhered, bonded, or attached thereto such that it does not come off as upon washing, etc.

The amount of the phosphorescent layer as when only containing pigment generally ranges from about 0.2 or 0.5 to about 3.0, 4.0, or 5.0 grams per 36 square inches of exposed non-black sidewall compound and desirably from about 1.0 to about 2.0 grams per 36 square inches of exposed non-black sidewall compound.

Another desirable process for incorporating a phosphorescent pigment layer onto the surface of the uncured non-black sidewall component involves utilizing a carrier to apply phosphorescent material to the sidewall component. This procedure is particularly desired where the non-black sidewall compound has insufficient tack and cannot hold the phosphorescent pigments. Typically, the carrier as utilized in the present invention, can be generally defined as any material which can be mixed with the phosphorescent material and can be used to transport or convey the composition onto or into contact with the desired surface such as the sidewall of a tire. It is desirable to have a carrier which penetrates into the rubber so that upon curing, the phosphorescent pigment is at least trapped or incorporated onto the surface of the sidewall, or at least partially embedded into or substantially carried into the surface of the sidewall, making the pigment not easily removable. Waxes such as microcrystalline or olefin, and plasticizers are examples of preferred carriers. The carriers are typically solid at room temperature and can be applied above their melting point which is generally at least 20° C., desirably at least 30° C., and preferably at least 50° C., as by brushing or spraying. A preferred carrier is stearic acid which is available from Sherex, of Dublin, Ohio. The carrier is substantially free of adhesives, polymers, rubbers and/or solvent. That is, the present invention contains generally less than 10, desirably less than 5, and preferably less than 2, 1 or 0 parts by weight of solvent, rubber, adhesives and/or polymers, based on 100 parts by weight of the carrier.

High glow-in-the-dark properties are obtained using a phosphorescent layer containing a carrier to apply phosphorescent pigment to a sidewall. The amount of pigment used in conjunction with a carrier is significantly less than amounts which would be needed to obtain the same glow-in-the-dark properties by mixing pigments in with the compounding or mixing of the sidewall component. The amount of phosphorescent pigment applied to the non-black sidewall component is generally that as noted above. The weight ratio of the carrier to the phosphorescent pigment in the phosphorescent layer is desirably from about 0.1 to about 10, and preferably from about 0.75 to about 1.25. The amount of phosphorescent pigment which is applied in conjunction with a carrier generally ranges from about 0.2 or 0.5 to about 3.0, 4.0, or 5.0 grams per 36 square inches of exposed non-black sidewall compound, and desirably from about 1.0 to about 2.0 grams per 36 square inches of exposed non-black sidewall compound.

As noted above, the preferred embodiment is to apply a phosphorescent layer to the sidewall tire in the form of a ring. A method of accomplishing the same is that after the sidewall components are extruded and assembled, the outer non-black component of the sidewall is sprayed with the phosphorescent composition, forming a continuous layer about the circumference of the sidewall. The phosphorescent layer containing sidewall is assembled into an uncured pneumatic tire, either before or after the phosphorescent layer or coating is applied, and cured. During curing, the sidewall component is crosslinked in the mold with the other portions of the tire and the phosphorescent pigment is trapped between the crosslinked rubber.

Referring to the drawings, the sidewall portion of the tire has recessed area 20 or areas therein. The recessed area shown is in the form of an annular ring or ring-like structure, which extends circumferentially around the sidewall portion of the tire. The recessed area contains phosphorescent layer 30, applied thereto by one of the methods of the present invention. The recessed area is protected from road or surface hazards such as curbs and other objects, and prevents phosphorescent layer from being worn or abraded away.

As utilized in the present invention, phosphorescence is defined as a type of luminescence in which the emission of radiation resulting from excitation of a material occurs after excitation has ceased. This phenomenon is characteristic of some organic compounds, as in the firefly, and also of a number of inorganic solid materials, both natural and synthetic. Phosphorescent pigments or phosphors are thus substances, either organic or inorganic, liquid or crystalline, which are capable of luminescence, that is, of absorbing energy from sources such as x-rays, cathode rays, UV radiation, alpha particles, incandescent lamps, streetlights, fluorescent lights, or car headlights and emitting a portion of the energy in the UV, visible, or infrared regions of spectra. On the other hand, fluorescent materials, antipodally, cease emission of energy immediately after the energy source is removed. While fluorescent materials can be utilized in sidewall components, the present invention is substantially free of, and preferably does not contain any fluorescent materials in the sidewall composition as they do not have any, or have extremely short glow-in-the-dark or afterglow properties desired by the present invention. Generally the present invention contains less than 20 parts by weight, less than 10 parts by weight, desirably less than 5 parts by weight, less than 3 parts by weight, and preferably less than 1 part by weight based on 100 parts by weight of rubber of the non-black component, and therefore, is substantially free of fluorescent materials.

Numerous types of phosphorescent pigments are known. The classic glow-in-the-dark or phosphorescent pigments contain of very fine crystals of zinc sulfide doped with copper (ZnS:Cu). The copper acts as an activator. Other pigments include CaS:Bi, CaStS:Bi and ZnCdS:Cu. The preferred phosphorescent pigment of the present invention is ZnS based 6SSU available from United Mineral & Chemical Corporation, 1100 Valley Brook Avenue, Lyndhurst, N.J. 07071.

Generally, afterglow of the phosphorescent pigment depends on particle size, excitation light source and intensity, and pigment concentration and film thickness.

Figure 3A:
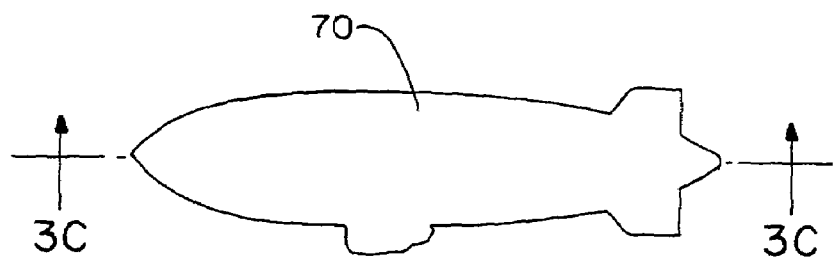
FIGS. 3(a) and 3(b) show phosphorescent decals of the present invention.
Figure 3B:
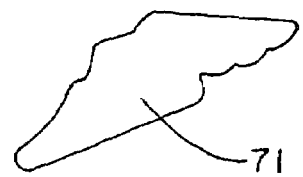
Figure 3C:
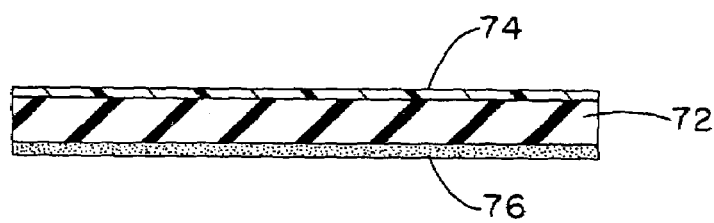
FIG. 3(c) shows a cross-sectional view of the decal in FIG. 3(a).
Figure 4:
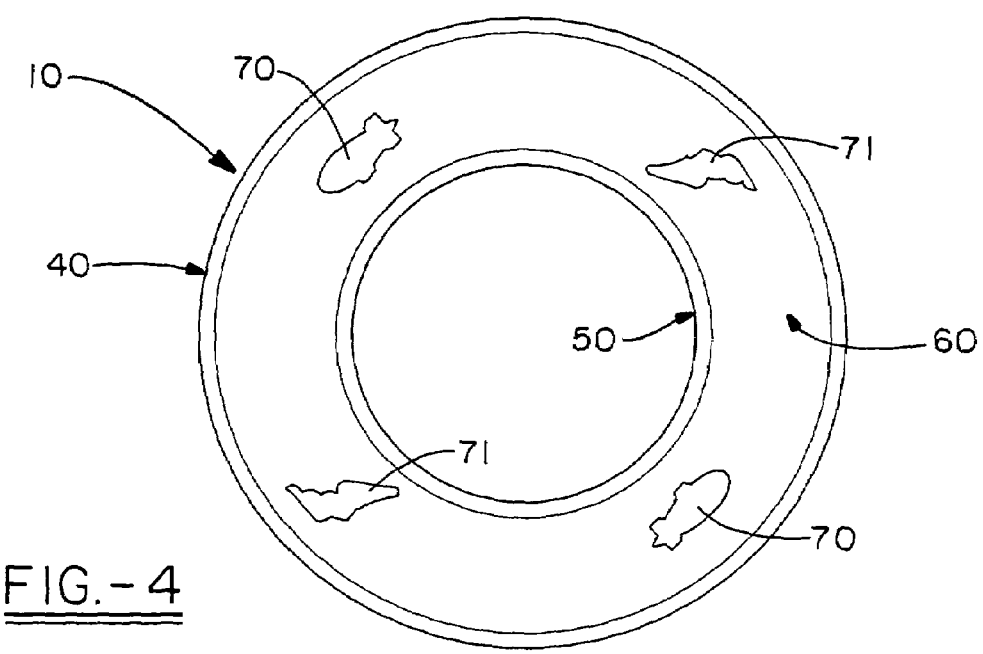
FIG. 4 shows a tire with phosphorescent decals of the present invention in the sidewall portion thereof.

A further embodiment of the present invention involves a tire having a decorative phosphorescent layer such as a glow-in-the-dark decal such as 70 or 71 as seen in FIGS. 3A and 3B, located in the sidewall portion thereof, and a method for making the same. The glow-in-the-dark decal also acts as a safety feature at night by glowing, thus making the tires more visible to side traffic.

The glow-in-the-dark decal can be prepared as follows. Uncured non-black or white sidewall compound, prepared from the composition as stated above, is milled or pressed into a thin rubber sheet 72. The milled rubber is squeezed optionally, but preferably between two sheets of release paper for generally from about 1 to about 20 minutes at about 5 to about 40 tons at a temperature ranging from about 100 to about 280° F. and preferably from about 200 to about 250° F. in a press to form a rubber sheet. The thickness of the rubber sheet is generally from about 0.005 to about 0.050 inches and preferably from about 0.015 to about 0.025 inches. If utilized, the release paper is removed from one side of the rubber sheet and phosphorescent pigment is applied thereto by any of the above stated methods. The amount of pigment is desirably the same as set forth herein above. Optionally, a protective film 74, for example, Mylar™ or nylon, is placed over the phosphorescent containing side of the rubber sheet, creating a laminate which then is cured generally for about 10 to about 50 minutes, and preferably for about 20 to about 30 minutes, at a temperature but generally from 280 to about 360° F., and preferably from about 290 to about 310° F. The cured laminate is then cut into a decal of desired shape such as a blimp or wingfoot.

An adhesive layer 76, which is optionally solvent-based or solventless, is applied to the back of the decal, on the face opposite the protective film. The adhesive layer can function as a stain resistant layer also. The preferred adhesive is solventless and is described in U.S. Pat. No. 5,503,940 and is fully incorporated herein by reference. Other suitable rubber-to-rubber adhesives are available commercially and can be utilized herein.

In practice, the decal can be placed in any desired location on the sidewall, which is preferably black, at any time before the tire goes in a press or mold to be cured. The preferred process involves first assembling the components of a tire and then placing the cured decal with uncured adhesive into/onto the uncured sidewall component. The decal can optionally be applied to the uncured sidewall component before being assembled into a tire.

Upon curing of the tire, including the adhesive, the decal is incorporated into and fixedly or permanently attached to the sidewall portion of the cured tire.

In an alternative embodiment, an uncured phosphorescent decal can be supplied or incorporated into an uncured sidewall compound without the use of an adhesive. The uncured phosphorescent containing rubber sheet is prepared according to the above noted procedure. The phosphorescent side of the rubber sheet is optionally covered with a protective film to protect it from an unclean mold surface. The rubber sheet or laminate can then be cut or formed into a decal of a desired shape. The decal is then applied to an uncured sidewall component of an uncured tire. The tire assembly is then cured generally for about 4 to about 50 minutes and preferably from 6 to about 20 minutes at a temperature generally from about 280 to about 360° F. and preferably from about 290 to about 310° F.

The resulting phosphorescent layers, e.g. a layer on the tire sidewall or a sidewall with at least one decal thereof, offer numerous advantages over the prior art. For example, the glow-in-the-dark tire can be more easily seen in low visibility or nighttime conditions when compared to conventional tires. The glow-in-the-dark sidewalls of the present invention do not discolor or lose their properties after weathering and prolonged exposure to sunlight.

The invention will be better understood by reference to the following examples which serve to illustrate, but not to limit the present invention.

EXAMPLES

The following formulation was utilized to make a white or non-black rubber sidewall compound:

TABLE A

WHITE SIDEWALL COMPOUND FORMULATION

| Material | Parts |
| --- | --- |
| Natural Rubber | 35 |
| Chlorobutyl Rubber | 60 |
| EPDM | 5 |
| Clay | 55 |
| TiO2 | 45 |
| Processing Aids | 7.5 |
| Fatty Acid | 1 |
| Mix well in an intensive mixer such as two roll mill, Banbury, or Brabender | |
| Sulfur | 1.2 |
| Sulfur Accelerators | 2.0 |
| Zinc Oxide | 5 |
| Antidegradant | 1 |
| Further Mix in an Intensive Mixer | |
| Total: | 217.7 |

Control White Sidewall Test Pieces.

A white sidewall compound as set forth in Table A was first milled and then shaped and cured in a mold having dimensions 6"×6"×0.1". Curing conditions were 20 minutes at 50° C. at 100 psi bladder pressure.

Incorporation of 6SSU in White Sidewall by a Two-Roll-Mill.

The white sidewall compound (200 g) and 6SSU (20 g) were mixed in a two-roll mill with the roll temperature set at 150° F. Then the white sidewall compound (WSW) containing 6SSU was cured in a mold (6"×6"×0.1") for 28 minutes at 300° F. at 100 psi.

The cured WSW test plaque containing 6SSU showed no glow-in-the-dark properties as molded. However, when the top surface was buffed, very low glow-in-the-dark properties were observed.

Incorporation of Neat Phosphorescent Pigment by Shake and Bake Technique.

Milled white sidewall compound (WSW) was shaped in a 6"×6"×0.1" mold at 200° F. for 5 minutes at 100 psi bladder pressure. The plate from one side of the mold was removed and the exposed hot white sidewall compound was placed on a pan filled with Luminova G300-C. Hot tacky surface of the WSW captured 1.3 g of Luminova G300-C. Then the sample was cured at 150° C. for 28 minutes at 100 psi. Abovementioned experiment was repeated using 6SSU and SG-05 and they captured 1.5 g and 1 g of materials, respectively per approximately 77 g test plaque.

Incorporation of Phosphorescent Pigment Using a Carrier.

Milled WSW compound was shaped in a 6"×6"×0.1" mold at 200 degrees F.° for 5 minutes at 100 psi pressure. The plate from one side was removed and 1.7 g of Luminova G300-C in 0.5 g of stearic acid was applied to the exposed hot surface. The phosphorescent material was uniformly distributed on the surface. Then the sample was cured at 150° C. for 28 minutes at 100 psi bladder pressure. Above experiment was repeated twice more using 0.5 g of stearic acid+1.5 g of 6SSU and 0.5 g of stearic acid+1.1 g of SG-05 respectively.

Testing

Cured pieced were cut into 4.4 cm×8.8 cm samples. Properties before and after aging were measured and reported in Table I.

TABLE 1

Comparison of properties of glow-in-the-dark white sidewalls

| Ingredients in WSW | Fluorescence in Sick units | Original L* (afterglow) | 168 h OUV L* (afterglow) | Fadeometer L* (afterglow) |
| --- | --- | --- | --- | --- |
| Control | 0 | 86.28 (None) | 82.15 (None) | 85.81 (None) |

TABLE 1-continued

Comparison of properties of glow-in-the-dark white sidewalls

| Ingredients in WSW | Fluorescence in Sick units | Original L* (afterglow) | 168 h OUV L* (afterglow) | Fadeometer L* (afterglow) |
|---|---|---|---|---|
| Luminova | 2 | 84.49 (Medium) | 80.18 (Medium) | 83.43 (Medium) |
| Sterax + Luminova | 2 | 83.97 (Medium) | 80.49 (Medium) | 83.59 (Medium) |
| 6SSU | 0 | 84.15 (High) | 80.36 (High) | 84.37 (High) |
| Sterax + 6SSU | 0 | 84.55 (High) | 80.98 (High) | 84.75 (High) |
| SG-05 | 28 | 85.56 (High) | 81.60 (High) | 86.31 (High) |
| Sterax + SG-05 | 21 | 85.34 (High) | 81.74 (High) | 85.50 (High) |

ᵃGlow-in-the-dark was uniform on the entire samples when Luminova or 6SSU were used while it was not very uniform when SG-05 was used.

Properties.

L* values were measured using a Hunter Ultrascan.

Fluorescent in Sick units were measured from a 3" distance using a LUT instrument.

Glow-in-the-dark properties were visually observed by taking a test piece from a lighted room into a dark enclosure. Relative ratings were given like high glow, medium glow, low glow, etc. Also observed whether glow is uniform or non-uniform throughout the sample.

Aging.

Aging of 4.4 cm×8.8 cm test plaques were done by exposing the pertinent surface to 169 hours in QUV, or 50 hours in Fadeometer or 10 weeks on the roof at Goodyear Research for sunlight exposure.

Results and Discussion

Preferred Process for Phosphorescent Pigment Incorporation.

Phosphorescent pigment can be incorporated by shear mixing, e.g., by blending white sidewall compound in a two-roll mill or a Banbury mixer. By this process the pigment is buried inside rubber or coated by rubber thus showing no glow-in-the-dark. By buffing the surface, the pigment gets slightly exposed; however, glow-in-the-dark properties were not up to the mark. Possibly, crystals of phosphorescent pigment broke down during shear mixing, thus significantly reducing the afterglow properties. Moreover, this process of incorporating pigments requires much higher amounts of relatively expensive pigment than required by the other two techniques.

Phosphorescent material incorporated by laminar mixing, e.g. by shake and bake technique, utilizes very low quantity of pigment and the rubber shows high glow-in-the dark properties compared to the one prepared by shear mixing and buffing. The pigment remained trapped as a layer on the rubber surface and did not come off on washing.

Stearic acid, when applied on green rubber and then cured, penetrates deep into the rubber. Thus, phosphorescent pigments which are mixed in the presence of stearic acid and applied to the rubber surface, remain on the outer surface while the stearic acid penetrates therein, thus giving high glow-in-the-dark properties. Moreover, since stearic acid has low melting point, the pigment can be applied uniformly onto the rubber surface. Like the shake and bake process, pigments incorporated by this technique show high glow-in-the-dark properties. High glow-in-the-dark properties were obtained by using only 0.04 g of pigment per square inch of white sidewall surface.

Fluorescence.

Control WSW compound and compound containing Luminova G300-C and 6SSU show negligible fluorescence while samples coated with SG-05 have appreciable fluorescence.

Whiteness Index.

L* is a measure of whiteness (100 for perfect white). All pigmented as well as non-pigmented materials show very close L* values in the range 84.15–86.28 thus indicating that these phosphorescent pigment do not affect significantly the degree of whiteness (see Table I). Even after accelerated aging for 168 hours in QUV and 50 hours in Fadeometer, the relative change of whiteness index of control white sidewall was almost the same as the experimental glow-in-the-dark sidewall. After the samples were exposed to sunlight for 10 weeks on the roof at Goodyear Research, they looked white without any deterioration in glow-in-the-dark properties.

Decals of the Present Invention were Prepared as Follows:

1. White sidewall compound of the above noted formula was milled to thin sheet. Thin sheet was squeezed between release paper for 5 minutes at 250° F. in a press to form a 6"×6"×0.3" sheet. Paper was removed from one side, Luminova-300-C powder was applied and then was covered with a Mylar film followed by curing for 28 minutes at 300° F.

2. Solventless RM038 adhesive was milled to thin sheet. A small piece was squeezed between release paper for 5 minutes at 250° F. in a press to form a 6"×6"×0.3" sheet.

3. Release paper from 1 was removed and joined to 2 (after removing release paper from one side). They were cut to Wingfoot shapes for application to tire sidewall compounds.

4. Steps 1 through 3 were repeated using 6SSU instead of Luminova-G300-C.

Placing Uncured Decals onto Tire Sidewall:

1. Apply uncured Luminova-300-C decals (without solventless adhesive) onto uncured white sidewall compound and cured in a mold for 28 minutes at 300° F.

2. Repeat above using uncured 6SSU decal.

3. Apply cured Luminova-300-C decals (with solventless adhesive) onto uncured white sidewall compound and cure in a mold for 28 minutes at 300° F.

4. Repeat above experiment using 6SSU decal.

Testing of Glow-in-the-Dark Properties:

The above prepared Wingfoot decals cured onto black sidewall compound were placed in well lighted room. Then light was switched off (dark) and the relative glow of the four samples were recorded in Table 2.

TABLE 2

Relative Glow-in-the-Dark Properties of Different Samples

| Applied As | Phosphorescent Pigment in Sample | Relative Afterglow | Comments |
|---|---|---|---|
| Uncured | Luminova-300-C | Low | Slight smearing of decal |
| Uncured | 6SSU | Medium | Slight smearing of decal |
| Cured | Luminova 300-C | Low | Looks Good |
| Cured | 6SSU | Medium | Looks Good |

Materials:

Lumonova-G300-C and 6SSU were obtained from United Mineral. Solventless adhesive (RM038) was made according to U.S. Pat. No. 5,503,940 issued Apr. 2, 1996.

While in accordance with the patent statutes the best mode and preferred embodiment have been set forth, the scope of the invention is not limited thereto, but rather by the scope of the attached claims.

What is claimed is:

1. A process for forming a tire with a sidewall having a phosphorescent layer thereon, comprising the steps of:
    applying a phosphorescent layer directly to an external surface of a non-black sidewall component;
    assembling said non-black sidewall component into a tire; and
    molding and curing said non-black sidewall component so that the phosphorescent layer is incorporated onto the crosslinked rubber sidewall surface, wherein the phosphorescent layer is phosphorescent pigment or a blend of said phosphorescent pigment and a carrier, said phosphorescent layer being substantially free of fluorescent material and wherein the carrier is free of rubber and an adhesive.

2. The process according to claim 1, wherein said phosphorescent pigment is present in an amount from about 0.2 to about 5.0 grams per 36 square inches of said external non-black sidewall component surface.

3. The process according to claim 2, wherein said phosphorescent pigment is present in an amount from about 1.0 to about 2.0 grams per 36 square inches of said external non-black sidewall component surface, and wherein said phosphorescent layer is located in a recessed portion of said sidewall.

4. The process according to claim 1, wherein said phosphorescent layer is said phosphorescent pigment and said carrier, and wherein said carrier is a wax or a plasticizer, or combinations thereof.

5. The process according to claim 4, wherein said phosphorescent layer is located in a recessed portion of said sidewall.

6. The process according to claim 4, wherein the weight ratio of said carrier to said phosphorescent pigment is from about 0.1 to 10.

7. The process according to claim 6, wherein said phosphorescent pigment is present in an amount from about 0.2 to about 5.0 grams per 36 square inches of external non-black sidewall component surface, wherein said non-black rubber comprises:
    (a) a conjugated diene rubber derived from at least one conjugated diene monomer having from 4 to about 10 carbon atoms, and optionally, one or more vinyl substituted aromatic monomers having from 8 to about 12 carbon atoms, or
    (b) a monoolefin rubber derived from at least one monoolefin monomer having from 4 to about 8 carbon atoms, said monoolefin rubber optionally halogenated, or
    (c) EPDM rubber, or
    (d) a rubber derived from at least one para-alkylstyrene monomer, or combinations thereof, and wherein the process includes the step of extruding the non-black sidewall component prior to application of the phosphorescent layer.

8. A process for forming a tire having a sidewall which contains a phosphorescent decal thereon, comprising the steps of:
    providing an uncured non-black rubber sheet;
    applying a phosphorescent layer directly to one side of the non-black rubber sheet;
    curing the sheet;
    cutting a decal from the cured sheet;
    placing the cured phosphorescent decal on an outer surface of a tire sidewall with the phosphorescent pigment layer facing outward;
    molding and curing said tire so that the phosphorescent decal is incorporated onto the crosslinked rubber sidewall surfaces wherein said phosphorescent decal optionally includes a protective film layer, and wherein said phosphorescent layer is substantially free of fluorescent material and free of rubber and adhesive.

9. The process according to claim 8, wherein said phosphorescent layer is a phosphorescent pigment, or a blend of a phosphorescent pigment in a carrier, or combinations thereof.

10. The process according to claim 9, wherein said carrier is a wax, a plasticizer, or combinations thereof.

11. The process according to claim 10, wherein said decal non-black rubber comprises:
    (a) a conjugated diene rubber derived from at least one conjugated diene monomer having from 4 to about 10 carbon atoms, and optionally, one or more vinyl substituted aromatic monomers having from 8 to about 12 carbon atoms, or
    (b) a monoolefin rubber derived from at least one monoolefin monomer having from 4 to about 8 carbon atoms, said monoolefin rubber optionally halogenated, or
    (c) EPDM rubber, or
    (d) a rubber derived from at least one para-alkyistyrene monomer, or combinations thereof.

12. The process according to claim 11, wherein said decal non-black rubber includes said (a) conjugated diene rubber and said (b) monoolefin rubber, wherein said conjugated diene rubber is natural rubber or is derived from butadiene or isoprene, or styrene and butadiene monomers, or combinations thereof, wherein said monoolefin rubber is halogenated and contains from about 0.1 to about 7% by weight of said conjugated diene monomer, and wherein said decal non-black rubber also includes from about 0.5 to about 10 parts by weight of said (c) EPDM rubber per 100 parts by weight of said conjugated diene rubber and said monoolefin rubber.

13. A tire having a phosphorescent glow-in-the-dark decal on the sidewall thereof, comprising:
    a cured substrate rubber located on a sidewall of the tire; and
    a cured phosphorescent decal, wherein said decal has been cured to said substrate rubber, wherein said decal includes a cured non-black rubber sheet layer having a first surface and a second surface and a phosphorescent layer directly on the first surface facing outward, wherein the phosphorescent layer is free of a rubber, an adhesive, a polymer, a solvent, and fluorescent material.

14. The tire according to claim 13, wherein said decal further comprises:
    an adhesive layer on the second surface of the decal non-black rubber sheet layer; and
    optionally, a protective film layer, wherein said decal non-black sheet layer comprises:
    a) a conjugated diene rubber derived from at least one conjugated diene monomer having from 4 to about 10 carbon atoms, and optionally, one or more vinyl substituted aromatic monomers having from 8 to about 12 carbon atoms, or b) a monoolefin rubber derived from at least one monoolefin monomer having from 4 to about 8 carbon atoms, said monoolefin rubber optionally halogenated, or c) EPDM rubber, or d) a rubber derived from at least one para-alkylstyrene monomer, or combinations thereof.

15. The tire according to claim 13, wherein said phosphorescent layer is a phosphorescent pigment or a blend of a phosphorescent pigment and a carrier.

16. A tire comprising:

a sidewall component; said sidewall component comprising a black rubber component and a non-black rubber component, wherein at least a portion of said non-black rubber component includes a phosphorescent layer directly on an outer surface of the non-black rubber component, wherein said phosphorescent layer is either (a) a phosphorescent pigment or (b) a blend of a phosphorescent pigment and a carrier, wherein said carrier is free of rubber, polymer, solvent, and an adhesive, wherein said tire has been cured, and said phosphorescent layer being substantially free of fluorescent material.

17. The tire according to claim 16, wherein said non-black rubber component comprises:

a) a conjugated diene rubber derived from at least one conjugated diene monomer having from 4 to about 10 carbon atoms, and optionally, one or more vinyl substituted aromatic monomers having from 8 to about 12 carbon atoms, or b) a monoolefin rubber derived from at least one monoolefin monomer having from 4 to about 8 carbon atoms, said monoolefin rubber optionally halogenated, or c) EPDM rubber, or d) a rubber derived from at least one para-alkylstyrene monomer, or combinations thereof.

18. The tire according to claim 17, wherein said non-black rubber includes said (a) conjugated diene rubber and said (b) monoolefin rubber, wherein said conjugated diene rubber is natural rubber or is derived from butadiene or isoprene, or styrene and butadiene monomers, or combinations thereof, wherein said monoolefin rubber is halogenated and contains from about 0.1 to about 7% by weight of said conjugated diene monomer, and wherein said non-black rubber component includes from about 0.5 to about 10 parts by weight of said (c) EPDM rubber per 100 parts by weight of said conjugated diene rubber and said monoolefin rubber.

19. The tire according to claim 18, wherein said phosphorescent layer is located in a recessed portion of said tire sidewall.

20. The tire according to claim 18, wherein the amount of said phosphorescent pigment is from about 0.2 to about 5.0 grams per 232.3 cm$^2$ of said external sidewall component.

21. The tire according to claim 20, wherein said phosphorescent layer is said blend of said phosphorescent pigment and said carrier, wherein the weight ratio of said carrier to said phosphorescent pigment is from about 0.1 to 10, and wherein said carrier is a wax or plasticizer.

22. The tire according to claim 16, wherein said phosphorescent layer is said blend of a phosphorescent pigment and a carrier, and wherein said carrier is a wax or plasticizer.

23. The tire according to claim 22, wherein said carrier is stearic acid.

24. The tire according to claim 19, wherein said recessed portion is an annular ring.

25. The tire according to claim 16, wherein said phosphorescent pigment is zinc sulfide doped with copper, or CaS:Bi, or ZnCdS:Cu, or a combination thereof.

26. The process according to claim 3, wherein said non-black rubber comprises:

a) a conjugated diene rubber derived from at least one conjugated diene monomer having from 4 to about 10 carbon atoms, and optionally, one or more vinyl substituted aromatic monomers having from 8 to about 12 carbon atoms, or b) a monoolefin rubber derived from at least one monoolefin monomer having from 4 to about 8 carbon atoms, said monoolefin rubber optionally halogenated, or c) EPDM rubber, or d) a rubber derived from at least one para-alkylstyrene monomer, or combinations thereof, and wherein said phosphorescent layer is a phosphorescent pigment, or a blend of said phosphorescent pigment and a carrier.

27. The process according to claim 26, wherein said phosphorescent layer is said phosphorescent pigment and said carrier, wherein the weight ratio of said carrier to said phosphorescent pigment is from about 0.1 to 10.

28. The process according to claim 27, wherein said phosphorescent pigment is zinc sulfide doped with copper, or CaS:Bi, or ZnCdS:Cu, or a combination thereof.

29. The process according to claim 28, wherein said carrier is stearic acid.

30. The process according to claim 7, wherein said phosphorescent pigment is zinc sulfide doped with copper, or CaS:Bi, or ZnCdS:Cu, or a combination thereof.

31. The process according to claim 30, wherein said carrier is stearic acid.

32. The process according to claim 11, wherein the amount of said phosphorescent pigment is from about 0.2 to about 5.0 grams per 36 square inches (232.3 cm$^2$) of said non-black rubber layer.

33. The process according to claim 32, wherein said phosphorescent layer is said blend comprising said phosphorescent pigment and said carrier, wherein the weight ratio of said carrier to said phosphorescent pigment is from about 0.1 to 10, and wherein the non-black rubber sheet has a thickness of from about 0.005 to about 0.050 inches.

34. The process according to claim 32, wherein said phosphorescent pigment is zinc sulfide doped with copper, or CaS:Bi, or ZnCdS:Cu, or a combination thereof.

35. The process according to claim 34, wherein said carrier is stearic acid, and wherein the non-black rubber sheet has a thickness of from about 0.005 to about 0.050 inches.

36. The tire according to claim 15, wherein said decal non-black rubber sheet layer comprises:

a) a conjugated diene rubber derived from at least one conjugated diene monomer having from 4 to about 10 carbon atoms, and optionally, one or more vinyl substituted aromatic monomers having from 8 to about 12 carbon atoms, or b) a monoolefin rubber derived from at least one monoolefin monomer having from 4 to about 8 carbon atoms, said monoolefin rubber optionally halogenated, or c) EPDM rubber, or d) a rubber derived from at least one para-alkylstyrene monomer, or combinations thereof.

37. The tire according to claim 36, wherein said decal non-black black rubber sheet layer includes said a) conjugated diene rubber and said b) monoolefin rubber, wherein said conjugated diene rubber is natural rubber or is derived from butadiene or isoprene, or styrene and butadiene monomers, or combinations thereof, wherein said monoolefin rubber is halogenated and contains from about 0.1 to about 7% by weight of said conjugated diene monomer, and wherein said decal non-black rubber sheet layer also includes from about 0.5 to about 10 parts by weight of said c) EPDM rubber per 100 parts by weight of said conjugated diene rubber and said monoolefin rubber.

38. The tire according to claim 37, wherein the amount of said phosphorescent pigment is from about 0.2 to about 5.0 grams per 36 square inches (232.3 cm$^2$) of said non-black rubber layer.

39. The tire according to claim 38, wherein said phosphorescent layer is said phosphorescent pigment and said carrier, and wherein the weight ratio of said carrier to said phosphorescent pigment is from about 0.1 to 10.

40. The tire according to claim 39, wherein the carrier is either a wax or a plasticizer.

41. The tire according to claim 40, wherein said phosphorescent pigment is zinc sulfide doped with copper, or CaS:Bi, or ZnCdS:Cu, or a combination thereof, and wherein said carrier is stearic acid.

* * * * *